United States Patent
Katoh

(10) Patent No.: US 11,378,049 B2
(45) Date of Patent: Jul. 5, 2022

(54) CONTROL DEVICE, VEHICLE, CONTROL SYSTEM, PROGRAM, AND CONTROL METHOD

(71) Applicant: TOYOTA JIDOSHA KABUSHIKI KAISHA, Toyota (JP)

(72) Inventor: Tatsunori Katoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/063,180

(22) Filed: Oct. 5, 2020

(65) Prior Publication Data

US 2021/0231090 A1  Jul. 29, 2021

(30) Foreign Application Priority Data

Jan. 29, 2020 (JP) .............................. JP2020-012961

(51) Int. Cl.
- *F02N 11/08* (2006.01)
- *B60R 25/20* (2013.01)
- *B60K 28/10* (2006.01)

(52) U.S. Cl.
CPC .. *F02N 11/0807* (2013.01); *F02N 2200/0802* (2013.01); *F02N 2200/0803* (2013.01); *F02N 2200/10* (2013.01); *F02N 2200/12* (2013.01)

(58) Field of Classification Search
CPC ......... F02N 11/0807; F02N 2200/0802; F02N 2200/803; H04L 67/125
See application file for complete search history.

(56) References Cited

U.S. PATENT DOCUMENTS

| | | | | |
|---|---|---|---|---|
| 4,345,554 A * | 8/1982 | Hildreth | ............. | B60H 1/00642 123/179.2 |
| 4,674,454 A * | 6/1987 | Phairr | ................. | F02N 11/0807 123/179.2 |
| 5,646,457 A * | 7/1997 | Vakavtchiev | ........... | B60R 25/00 123/179.2 |
| 5,656,868 A * | 8/1997 | Gottlieb | .............. | F02N 11/0807 123/179.2 |
| 5,673,017 A * | 9/1997 | Dery | ....................... | B60R 25/00 123/179.2 |
| 6,786,846 B2 * | 9/2004 | Chang | .................... | B60K 28/10 123/179.2 |

(Continued)

FOREIGN PATENT DOCUMENTS

JP   2001-180328 A   7/2001

*Primary Examiner* — Phutthiwat Wongwian
*Assistant Examiner* — Arnold Castro
(74) *Attorney, Agent, or Firm* — Oblon, McClelland, Maier & Neustadt, L.L.P.

(57) ABSTRACT

A control device is configured to control a vehicle in which an engine is able to be started in response to a request signal transmitted from the outside of the vehicle. The control device includes a controller. The controller acquires the result of detection about the vehicle state of the vehicle from a first sensor group including one or more sensors able to detect the vehicle state of the vehicle before the engine of the vehicle is started in response to the request signal, starts the engine in a case where the vehicle state satisfies a first condition including a condition relating to a range of a transmission of the vehicle, and does not start the engine in a case where the vehicle state does not satisfy the first condition.

17 Claims, 6 Drawing Sheets

(56) References Cited

U.S. PATENT DOCUMENTS

| | | | | |
|---|---|---|---|---|
| 7,046,126 | B2* | 5/2006 | Flick | B60R 16/03 307/10.1 |
| 8,410,929 | B2* | 4/2013 | Flick | F02N 11/0807 340/540 |
| 8,781,900 | B2* | 7/2014 | Schwarz | G06Q 30/0261 705/14.63 |
| 9,454,786 | B1* | 9/2016 | Srey | G06Q 30/0283 |
| 9,701,279 | B1* | 7/2017 | Morgan | G07C 5/008 |
| 9,981,616 | B2* | 5/2018 | Flick | B60R 16/023 |
| 2004/0249534 | A1* | 12/2004 | Yamada | B60R 16/03 701/36 |
| 2005/0246070 | A1* | 11/2005 | Matsuura | F02N 11/0807 701/2 |
| 2009/0251284 | A1* | 10/2009 | Wilson | F02N 11/0807 340/5.64 |
| 2013/0151132 | A1* | 6/2013 | Harumoto | F02N 11/0807 701/113 |
| 2014/0277848 | A1* | 9/2014 | Flick | F16H 61/00 701/2 |
| 2018/0111596 | A1* | 4/2018 | Kim | B60T 7/16 |
| 2018/0126849 | A1* | 5/2018 | Kanagaraj | B60K 28/10 |
| 2018/0216594 | A1* | 8/2018 | Popp | F02N 11/103 |
| 2018/0340502 | A1* | 11/2018 | Boulais | F02N 11/0807 |
| 2018/0347532 | A1* | 12/2018 | Tamane | G07C 5/0841 |
| 2019/0389477 | A1* | 12/2019 | Balakrishna | F02N 11/0811 |
| 2020/0086878 | A1* | 3/2020 | Ohtomo | B60W 30/192 |
| 2020/0271081 | A1* | 8/2020 | Mulshine | B60R 25/1012 |
| 2021/0107453 | A1* | 4/2021 | Shelton | B60W 10/182 |
| 2021/0172484 | A1* | 6/2021 | Kwon | F02N 11/0807 |
| 2021/0180554 | A1* | 6/2021 | Park | B60Q 9/00 |
| 2021/0222660 | A1* | 7/2021 | Gil Vera | F02N 11/0807 |
| 2021/0237534 | A1* | 8/2021 | Badger, II | H04L 67/125 |

* cited by examiner

CONTROL DEVICE, VEHICLE, CONTROL SYSTEM, PROGRAM, AND CONTROL METHOD

CROSS-REFERENCE TO RELATED APPLICATION

This application claims priority to Japanese Patent Application No. 2020-012961 filed on Jan. 29, 2020, incorporated herein by reference in its entirety.

BACKGROUND

1. Technical Field

The disclosure relates to a control device, a vehicle, a control system, a program, and a control method.

2. Description of Related Art

In the related art, a technique in which an engine of a vehicle is started by means of remote control is known.

For example, in the morning of a cold day, a user can warm the inside of a vehicle in advance by starting an engine of the vehicle and operating an air conditioning device of the vehicle by means of remote control just before the user gets on the vehicle.

In a case where an engine of a vehicle is to be started by means of remote control in order to operate an air conditioning device, it is necessary to ensure safety such that the vehicle does not start to move unintentionally.

For example, Japanese Unexamined Patent Application Publication No. 2001-180328 (JP 2001-180328 A)) discloses a technique in which supply of electric power to an ignition coil is stopped and an engine is stopped in a case where a sensor monitoring movement of a vehicle detects movement of the vehicle when the engine of the vehicle is started by means of remote control.

SUMMARY

It is desired to further improve safety at the time of the start of an engine of a vehicle performed by means of remote control.

The disclosure provides a control device, a vehicle, a control system, a program, and a control method with which it is possible to improve safety at the time of the start of an engine of a vehicle performed by means of remote control.

A first aspect of the disclosure relates to a control device in which an engine is able to be started in response to a request signal transmitted from the outside of the vehicle. A first aspect of the disclosure relates to a control device in which an engine is able to be started in response to a request signal transmitted from the outside of the vehicle. The control device includes a controller. The controller acquires the result of detection about the vehicle state of the vehicle from a first sensor group including one or more sensors able to detect the vehicle state of the vehicle before the engine of the vehicle is started in response to the request signal, starts the engine in a case where the vehicle state satisfies a first condition including a condition relating to a range of a transmission of the vehicle, and does not start the engine in a case where the vehicle state does not satisfy the first condition.

A second aspect of the disclosure relates to a program causing a control device configured to control a vehicle in which an engine is able to be started in response to a request signal transmitted from the outside of the vehicle to perform an operation. The operation includes acquiring the result of detection about the vehicle state of the vehicle from a first sensor group including one or more sensors able to detect the vehicle state of the vehicle before the engine of the vehicle is started in response to the request signal, starting the engine in a case where the vehicle state satisfies a first condition including a condition relating to a range of a transmission of the vehicle, and not starting the engine in a case where the vehicle state does not satisfy the first condition.

A third aspect of the disclosure relates to a control method for a control device configured to control a vehicle in which an engine is able to be started in response to a request signal transmitted from the outside of the vehicle. The method includes acquiring the result of detection about the vehicle state of the vehicle from a first sensor group including one or more sensors able to detect the vehicle state of the vehicle before the engine of the vehicle is started in response to the request signal, starting the engine in a case where the vehicle state satisfies a first condition including a condition relating to a range of a transmission of the vehicle, and not starting the engine in a case where the vehicle state does not satisfy the first condition.

According to the aspects of the disclosure, it is possible to further improve safety at the time of the start of an engine of a vehicle performed by means of remote control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to drawings.

Figure 1:
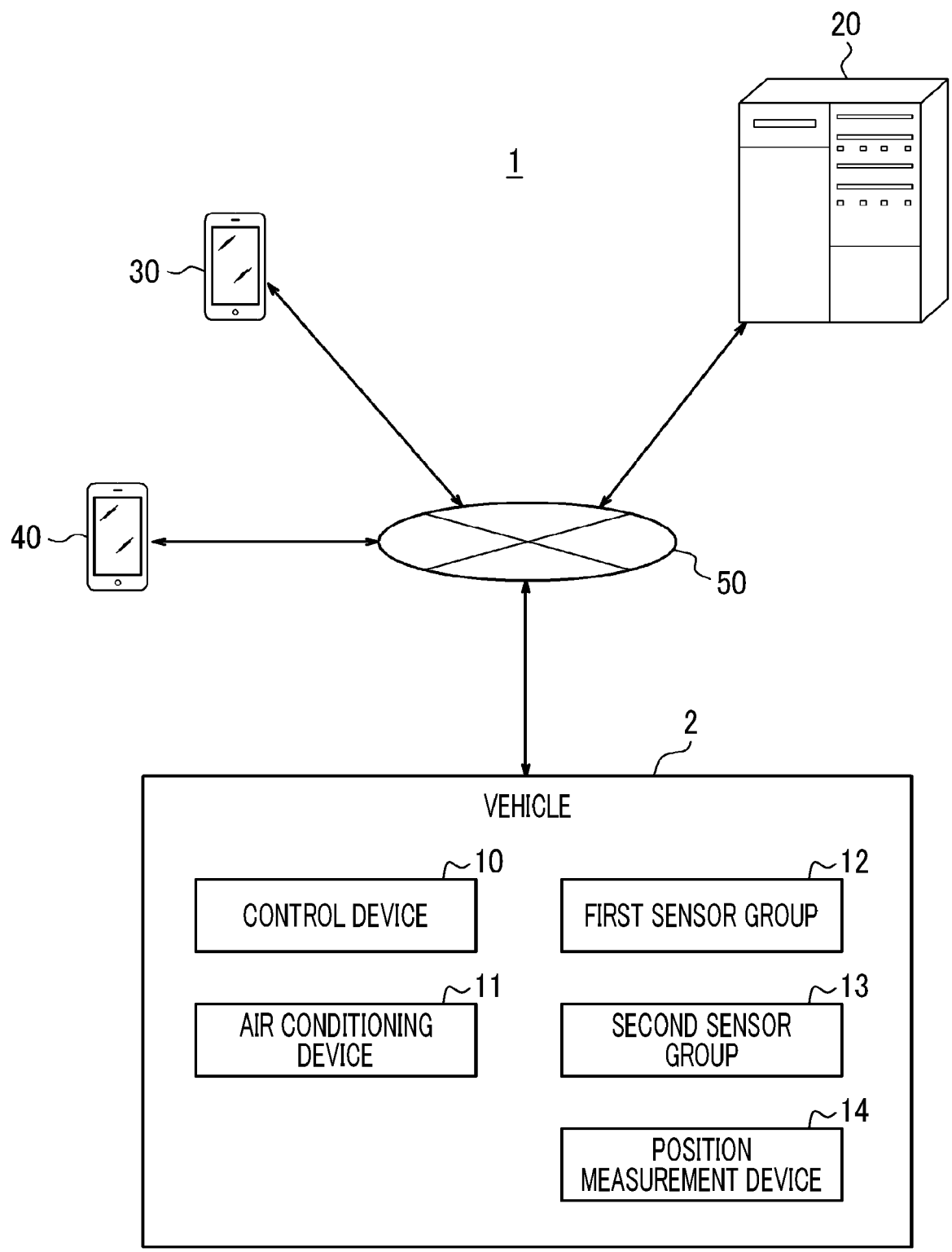
FIG. 1 is a diagram illustrating the configuration of a control system according to an embodiment of the disclosure.

FIG. 1 is a diagram illustrating the configuration of a control system 1 according to the embodiment of the disclosure. The configuration and outline of the control system 1 according to the embodiment of the disclosure will be described with reference to FIG. 1.

The control system 1 includes a vehicle 2, an information processing apparatus 20, a first terminal device 30, and a second terminal device 40. The vehicle 2, the information processing apparatus 20, the first terminal device 30, and the second terminal device 40 are connected to each other via a network 50 such that the vehicle 2, the information processing apparatus 20, the first terminal device 30, and the second terminal device 40 can communicate with each other. The network 50 may be a network including a mobile communication network and the Internet.

In FIG. 1, one vehicle 2, one information processing apparatus 20, one first terminal device 30, and one second terminal device 40 are shown. However, the number of the vehicles 2, the number of the information processing apparatuses 20, the number of the first terminal devices 30, and the number of the second terminal devices 40 may be two or more.

The first terminal device 30 transmits, to the information processing apparatus 20, a request signal requesting the start of an engine of the vehicle 2 in response to an operation performed by a user. When the information processing apparatus 20 receives the request signal from the first terminal device 30, the information processing apparatus 20 transmits the request signal to the vehicle 2 associated with the first terminal device 30. Regarding the vehicle 2, the engine of the vehicle 2 can be started in response to a request signal transmitted from a device outside the vehicle 2 such as the first terminal device 30.

The vehicle 2 is any kind of vehicle such as a gasoline vehicle, a diesel vehicle, a hybrid vehicle (HV), a plug-in hybrid vehicle (PHV), an electric vehicle (EV), and a fuel cell vehicle (FCV). The driving of the vehicle 2 may be automated at any level. The level of automation is, for example, any of level 1 to level 5 in the level classification of the Society of Automotive Engineers (SAE). The vehicle 2 may be a vehicle dedicated to Mobility as a Service (Maas). The configuration of the vehicle 2 will be described later.

The information processing apparatus 20 can communicate with the vehicle 2, the first terminal device 30, and the second terminal device 40 via the network 50. The information processing apparatus 20 receives the request signal requesting the start of the engine of the vehicle 2 from the first terminal device 30. When the information processing apparatus 20 receives the request signal from the first terminal device 30, the information processing apparatus 20 transmits the request signal to the vehicle 2 associated with the first terminal device 30.

The information processing apparatus 20 is, for example, a dedicated computer configured to function as a server. The information processing apparatus 20 may be a general-purpose personal computer (PC).

The first terminal device 30 can communicate with the vehicle 2, the information processing apparatus 20, and the second terminal device 40 via the network 50. The first terminal device 30 transmits, to the information processing apparatus 20, a request signal requesting the start of an engine of the vehicle 2 in response to an operation performed by a user. The first terminal device 30 is a device outside the vehicle 2 that can start the engine of the vehicle 2 by means of remote control.

The first terminal device 30 may be a dedicated device capable of starting the engine of the vehicle 2 by means of remote control and may be a general-purpose terminal device. In a case where the first terminal device 30 is a general-purpose terminal device, the first terminal device 30 may be, for example, a smartphone or a tablet. In addition, in a case where the first terminal device 30 is a general-purpose terminal device, a dedicated program used to start the engine of the vehicle 2 by means of remote control may be installed in the first terminal device 30.

The second terminal device 40 can communicate with the vehicle 2, the information processing apparatus 20, and the first terminal device 30 via the network 50. The second terminal device 40 is a terminal device possessed by the user of the vehicle 2. The second terminal device 40 may be, for example, a smartphone or a tablet.

In FIG. 1, the first terminal device 30 and the second terminal device 40 are shown as different devices. However, one terminal device may have the functions of both of the first terminal device 30 and the second terminal device 40.

As shown in FIG. 1, the vehicle 2 includes a control device 10, an air conditioning device 11, a first sensor group 12, a second sensor group 13, and a position measurement device 14. The control device 10, the air conditioning device 11, the first sensor group 12, the second sensor group 13, and the position measurement device 14 are connected to each other such that the control device 10, the air conditioning device 11, the first sensor group 12, the second sensor group 13, and the position measurement device 14 can communicate with each other via a vehicle-mounted network such as a controller area network (CAN) or a dedicated line.

The control device 10 determines the vehicle state of the vehicle 2 before the engine of the vehicle 2 is started in response to the request signal transmitted from the first terminal device 30. The control device 10 starts the engine of the vehicle 2 in a case where the vehicle state satisfies a predetermined condition and does not start the engine of the vehicle 2 in a case where the vehicle state does not satisfy the predetermined condition. The vehicle 2 may operate the air conditioning device 11 when the engine is started. Accordingly, the inside of the vehicle 2 can be warmed before the user gets on the vehicle 2 when the engine is started by means of remote control.

Figure 2:
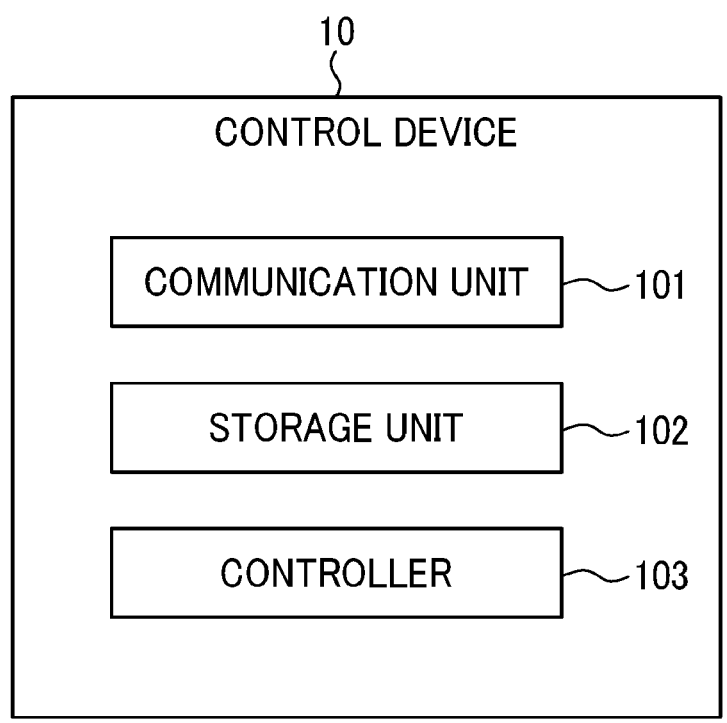
FIG. 2 is a block diagram illustrating the configuration of a control device according to the embodiment of the disclosure.

The control device 10 may be an electronic control unit (ECU), for example. As shown in FIG. 2, the control device 10 includes a communication unit 101, a storage unit 102, and a controller 103.

The communication unit 101 includes a communication module connected to the network 50. For example, the communication unit 101 may include a communication module conforming to mobile communication standards such as Long Term Evolution (LTE), the 4th Generation (4G), and the 5th Generation (5G). In the embodiment, the control device 10 is connected to the network 50 via the communication unit 101. The communication unit 101 transmits and receives various kinds of information via the network 50. The communication unit 101 can communicate with the information processing apparatus 20, the first terminal device 30, and the second terminal device 40 via the network 50.

The storage unit 102 is a semiconductor memory, a magnetic memory, an optical memory, or the like. However, the storage unit 102 is not limited thereto. The storage unit 102 may function as a main storage device, an auxiliary storage device, or a cache memory, for example. The storage unit 102 stores any information used to operate the control device 10. For example, the storage unit 102 may store a system program, an application program, or various kinds of information received by the communication unit 101. Information stored in the storage unit 102 may be updatable with information that is received from the network 50 via the communication unit 101, for example. A portion of the storage unit 102 may be installed outside the control device 10. In this case, the portion of the storage unit 102 installed outside may be connected to the control device 10 via any interface.

The controller 103 includes at least one processor, at least one dedicated circuit, or a combination thereof. The processor is a general-purpose processor such as a central processing unit (CPU) and a graphics processing unit (GPU) or a dedicated processor dedicated to a specific process. The dedicated circuit is, for example, a field-programmable gate array (FPGA) or an application specific integrated circuit (ASIC). The controller 103 performs processing relating to the operation of the control device 10 while controlling each part of the control device 10.

The constituent elements of the vehicle 2 will be described with reference to FIG. 1 again.

The air conditioning device 11 can send warm air or cold air. The air conditioning device 11 has an air conditioning function of adjusting the temperature of the inside of the vehicle 2 by sending warm air or cold air. Note that, in a case where the vehicle 2 is a gasoline vehicle or the like, the air conditioning device 11 may be driven by electric power supplied from an alternator of which the drive source is rotation of the engine of the vehicle 2.

The first sensor group 12 includes one or more sensors able to detect the vehicle state of the vehicle 2. The first sensor group 12 may include, for example, a sensor that detects transmission range settings, a sensor that detects the state of a foot brake, a sensor that detects the state of a parking brake, a sensor that detects the state of an accelerator, a sensor that detects whether the engine is on or off, a sensor that detects whether a door is open or closed, a sensor that detects whether or not a door is in a locked state, a sensor that detects whether or not a smart key is in the vehicle, an acceleration sensor that detects movement of the vehicle, an in-vehicle camera that images the inside of the vehicle, and the like. Note that, the first sensor group 12 does not need to include all of the sensors and may include one or more of the sensors. In addition, the first sensor group 12 may include a sensor other than the above-described sensors.

The second sensor group 13 includes one or more sensors able to detect the state of the vicinity of the vehicle 2. The second sensor group 13 may include, for example, a clearance sonar that detects an object in the vicinity of the vehicle 2 by means of ultrasonic waves or the like, a blind spot monitor that detects an object in the vicinity of the vehicle 2 by means of a radar, and a carbon monoxide sensor that measures the concentration of carbon monoxide in the vicinity of the vehicle 2, an out-of-vehicle camera that images the vicinity of the vehicle 2, and the like. Note that, the second sensor group 13 does not need to include all of the sensors and may include one or more of the sensors. In addition, the second sensor group 13 may include a sensor other than the above-described sensors.

The position measurement device 14 includes one or more receivers compatible with any satellite positioning system. For example, the position measurement device 14 may include a receiver compatible with the global positioning system (GPS). The position measurement device 14 acquires, as position information, measured values corresponding to the position of the position measurement device 14. The position information includes, for example, an address, a latitude, a longitude, an altitude, and the like. Since the position measurement device 14 is installed in the vehicle 2, the position information acquired by the position measurement device 14 is the position information of the vehicle 2.

Figure 3:
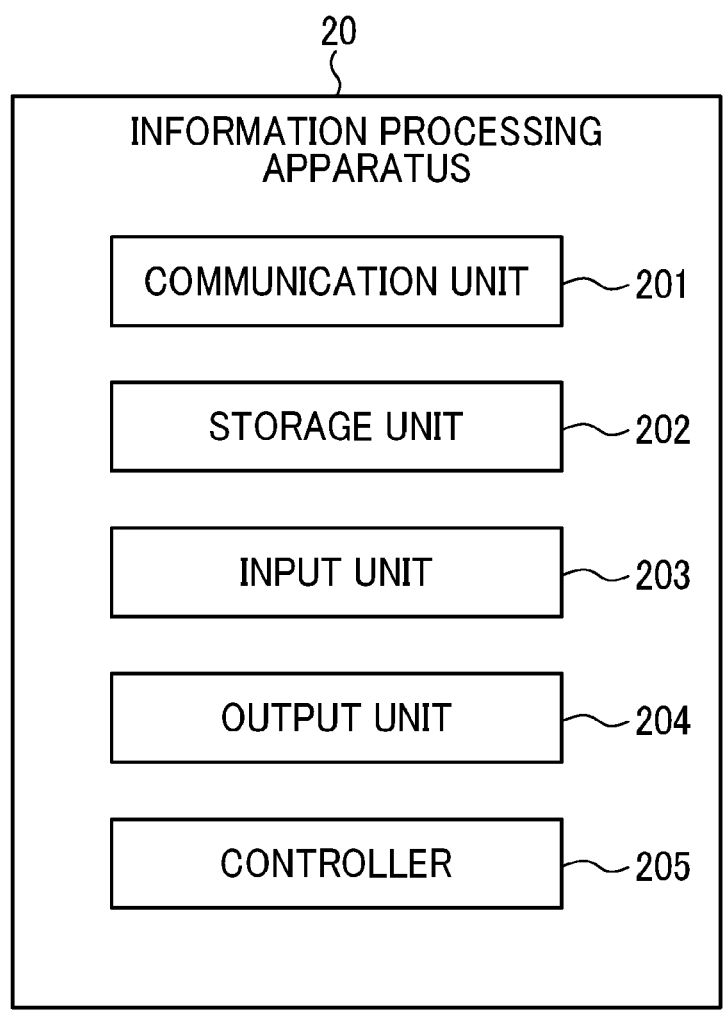
FIG. 3 is a block diagram illustrating the configuration of an information processing apparatus according to the embodiment of the disclosure.

The configuration of the information processing apparatus 20 according to the embodiment of the disclosure will be described with reference to FIG. 3.

The information processing apparatus 20 includes a communication unit 201, a storage unit 202, an input unit 203, an output unit 204, and a controller 205.

The communication unit 201 includes a communication module connected to the network 50. For example, the communication unit 201 may include a communication module supporting a local area network (LAN). In the embodiment, the information processing apparatus 20 is connected to the network 50 via the communication unit 201. The communication unit 201 transmits and receives various kinds of information via the network 50. The communication unit 201 can communicate with the vehicle 2, the first terminal device 30, and the second terminal device 40 via the network 50.

The storage unit 202 is a semiconductor memory, a magnetic memory, an optical memory, or the like. However, the storage unit 202 is not limited thereto. The storage unit 202 may function as a main storage device, an auxiliary storage device, or a cache memory, for example. The storage unit 202 stores any information used to operate the information processing apparatus 20. For example, the storage unit 202 may store a system program, an application program, or various kinds of information received by the communication unit 201. Information stored in the storage unit 202 may be updatable with information that is received from the network 50 via the communication unit 201, for example. A portion of the storage unit 202 may be installed outside the information processing apparatus 20. In this case, the portion of the storage unit 202 installed outside may be connected to the information processing apparatus 20 via any interface.

The input unit 203 includes one or more input interfaces that detect user input and acquire input information based on an operation performed by the user. For example, the input unit 203 is a physical key, a capacitive key, a touch screen integrally provided with a display of the output unit 204, a microphone that receives a voice input, or the like. However, the input unit 203 not limited thereto.

The output unit 204 includes one or more output interfaces that output information to notify the user. For example, the output unit 204 is a display that outputs information by means of a video, a speaker that outputs information by means of a voice, or the like. However, the output unit 204 is not limited thereto.

The controller 205 includes at least one processor, at least one dedicated circuit, or a combination thereof. The processor is a general-purpose processor such as a CPU and a GPU or a dedicated processor dedicated to a specific process. The dedicated circuit is, for example, an FPGA or an ASIC. The controller 205 performs processing relating to the operation of the information processing apparatus 20 while controlling each part of the information processing apparatus 20.

Figure 4:
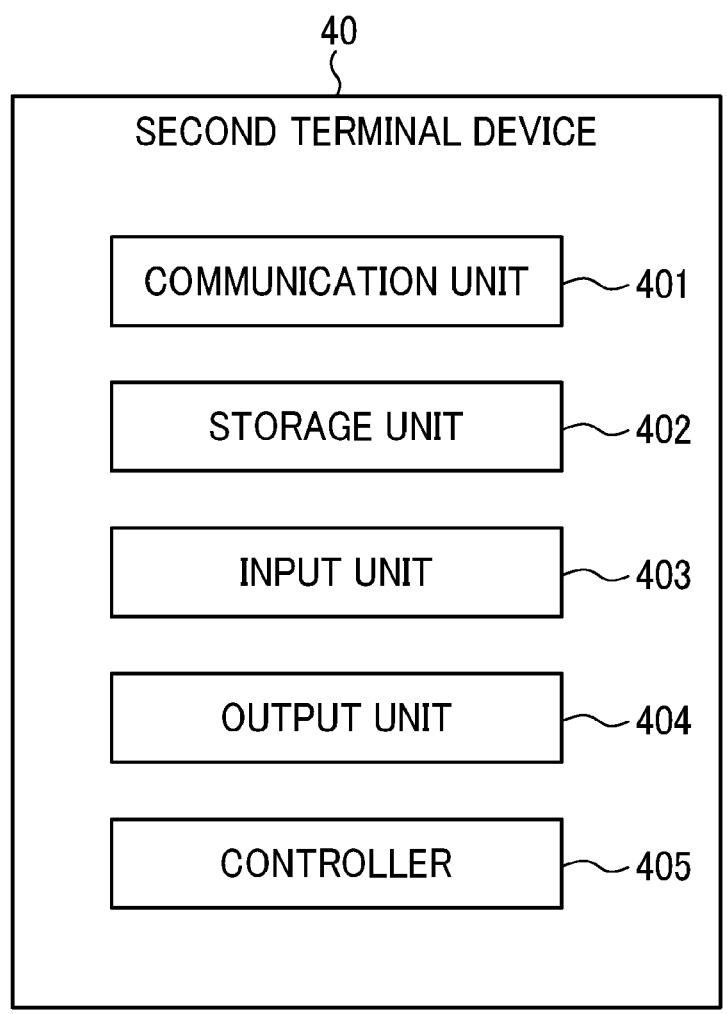
FIG. 4 is a block diagram illustrating the configuration of a second terminal device according to the embodiment of the disclosure.

The configuration of the second terminal device 40 according to the embodiment of the disclosure will be described with reference to FIG. 4.

The second terminal device 40 includes a communication unit 401, a storage unit 402, an input unit 403, an output unit 404, and a controller 405.

The communication unit 401 includes a communication module connected to the network 50. For example, the communication unit 401 may include a communication module conforming to mobile communication standards such LTE, 4G, and 5G. In the embodiment, the second terminal device 40 is connected to the network 50 via the communication unit 401. The communication unit 401 transmits and receives various kinds of information via the network 50. The communication unit 401 can communicate with the vehicle 2, the information processing apparatus 20, and the first terminal device 30 via the network 50.

The storage unit 402 is a semiconductor memory, a magnetic memory, an optical memory, or the like. However, the storage unit 402 is not limited thereto. The storage unit 402 may function as a main storage device, an auxiliary storage device, or a cache memory, for example. The storage unit 402 stores any information used to operate the second terminal device 40. For example, the storage unit 402 may store a system program, an application program, or various kinds of information received by the communication unit 401. Information stored in the storage unit 402 may be updatable with information that is received from the network 50 via the communication unit 401, for example. A portion of the storage unit 402 may be installed outside the second terminal device 40. In this case, the portion of the storage unit 402 installed outside may be connected to the second terminal device 40 via any interface.

The input unit 403 includes one or more input interfaces that detect user input and acquire input information based on an operation performed by the user. For example, the input unit 403 is a physical key, a capacitive key, a touch screen integrally provided with a display of the output unit 404, a microphone that receives a voice input, or the like. However, the input unit 403 not limited thereto.

The output unit 404 includes one or more output interfaces that output information to notify the user. For example, the output unit 404 is a display that outputs information by means of a video, a speaker that outputs information by means of a voice, or the like. However, the output unit 404 is not limited thereto.

The controller 405 includes at least one processor, at least one dedicated circuit, or a combination thereof. The processor is a general-purpose processor such as a CPU and a GPU or a dedicated processor dedicated to a specific process. The dedicated circuit is, for example, an FPGA or an ASIC. The controller 405 performs processing relating to the operation of the second terminal device 40 while controlling each part of the second terminal device 40.

Operation of Control System

The operation of the control system 1 shown in FIG. 1 will be described with reference to FIGS. 1 to 4.

The first terminal device 30 transmits, to the information processing apparatus 20, a request signal requesting the start of an engine of the vehicle 2 in response to an operation performed by a user. For example, in the morning of a cold day, the user operates the first terminal device 30 such that the request signal is transmitted to the information processing apparatus 20 about 10 to 20 minutes before the user gets on the vehicle 2.

The controller 205 of the information processing apparatus 20 acquires the request signal transmitted by the first terminal device 30, via the communication unit 201. The request signal includes an identifier for identification of the vehicle 2 corresponding thereto.

When the controller 205 acquires the request signal, transmits the request signal to the vehicle 2 corresponding to the identifier included in the request signal via the communication unit 201.

When the vehicle 2 receives the request signal, the control device 10 determines whether or not the vehicle 2 is in a state where starting the engine of the vehicle 2 causes no problem. The control device 10 causes the engine to be started in a case where the vehicle 2 is in a state where starting the engine causes no problem and does not cause the engine to be started in a case where the vehicle 2 is not in a state where starting the engine causes no problem. The above-described processing performed by the control device 10 will be described in detail below.

When the vehicle 2 receives the request signal, the controller 103 of the control device 10 acquires the result of detection about the vehicle state of the vehicle 2 from the first sensor group 12 via the communication unit 101 before the engine of the vehicle 2 is started.

The controller 103 determines whether or not the vehicle state satisfies a first condition based on the vehicle state of the vehicle 2 acquired from the first sensor group 12. The first condition includes at least a condition relating to a range of the transmission of the vehicle 2.

The vehicle state of the vehicle 2 that the controller 103 acquires from the first sensor group 12 includes information about the transmission range settings of the vehicle 2. The information about the transmission range settings of the vehicle 2 includes information about whether each of a parking range, a drive range, a reverse range, and a neutral range is on or off. For example, in a case where the parking range is selected, the parking range is on and the other ranges such as the drive range, the reverse range, and the neutral range are off.

The first condition includes a condition as follows.

A condition that "the parking range is on and ranges other than the parking range are off in the transmission range settings of the vehicle 2".

Hereinafter, the condition as above will also be referred to as a "condition A".

The controller 103 determines whether or not the vehicle state satisfies the first condition including the condition A and the controller 103 starts the engine of the vehicle 2 in a case where the first condition is satisfied and does not start the engine of the vehicle 2 in a case where the first condition is not satisfied.

As a result, the controller 103 can start the engine of the vehicle 2 in a state where it is certain that the transmission of the vehicle 2 is in the parking range. For example, in a case where a shift lever is at an intermediate position between the parking range and the reverse range, both of the parking range and the reverse range may become on in the transmission range settings of the vehicle 2. When the engine is started in such a state based solely on a fact that the parking range is on, the vehicle 2 may move backward since the reverse range is also on. With the controller 103 starting the engine on a condition that ranges other than the parking range are off in addition to a condition that the parking range is on as in the present embodiment, it is possible to prevent the engine from being started in a state where the shift lever is at an intermediate position between the parking range and the reverse range.

The first condition may include a condition as follows instead of the condition A.

A condition that "any one of a condition that the parking range is on and ranges other than the parking range are off in the transmission range settings of the vehicle 2 and a condition that the neutral range is on, ranges other than the neutral range are off, and a parking brake of the vehicle 2 is on in the transmission range settings of the vehicle 2 is satisfied".

Hereinafter, the condition as above will also be referred to as a "condition B".

In a case where the first condition includes the condition B instead of the condition A, the controller 103 determines whether or not the vehicle state satisfies the first condition including the condition B and the controller 103 starts the engine of the vehicle 2 in a case where the first condition is satisfied and does not start the engine of the vehicle 2 in a case where the first condition is not satisfied.

In a case where the first condition includes the condition B instead of the condition A, the controller 103 starts the engine of the vehicle 2 even in a case where the neutral range is on, the ranges other than the neutral range are off, and the parking brake of the vehicle 2 is on in the transmission range settings of the vehicle 2. Even in a case where the neutral range is on instead of the parking range in the transmission range settings of the vehicle 2, the vehicle 2 is not moved even when the engine of the vehicle 2 is started in a case where the parking brake is on. Therefore, the first condition may include the condition B instead of the condition A.

Note that, in a case where the controller 103 determines whether or not the first condition including the condition B is satisfied, the vehicle state of the vehicle 2 that the controller 103 acquires from the first sensor group 12 includes information about the parking brake of the vehicle 2.

The first condition may include a condition that there is no person on board the vehicle 2 in addition to the condition A or the condition B. For example, when the engine of the vehicle 2 is started in a state where there is a third person on board the vehicle 2, there is a possibility that the third person rides away with the vehicle 2. In addition, for example, when the engine of the vehicle 2 is started in a state where a family is on board the vehicle 2, there is a possibility that the family is injured by the vehicle 2 suddenly moving. With the first condition including a condition that there is no person on board the vehicle 2 in addition to the condition A or the condition B, the control device 10 can reduce the possibilities as above.

The controller 103 may determine whether or not there is a person on board the vehicle 2 based on the result of detection performed by various kinds of sensors included in the first sensor group 12.

For example, the controller 103 may determine that there is a possibility that there is a person on board the vehicle 2 in a case where the sensor that detects the state of the foot brake detects that the foot brake is being operated.

In addition, for example, the controller 103 may determine that there is a possibility that there is a person on board the vehicle 2 in a case where the sensor that detects the state of the accelerator detects that the accelerator is being operated.

In addition, for example, the controller 103 may determine that there is a possibility that there is a person on board the vehicle 2 in a case where the sensor that detects whether or not the smart key is in the vehicle detects that the smart key is in the vehicle.

In addition, for example, the controller 103 may determine that there is a person on board the vehicle 2 in a case where the in-vehicle camera that images the inside of the vehicle detects that a person is present in the vehicle.

The first condition may include a condition that the vehicle 2 is in a parked state in addition to the condition A or the condition B. The controller 103 may determine whether or not the vehicle 2 is in a parked state based on the result of detection performed by the various kinds of sensors included in the first sensor group 12.

For example, the controller 103 may determine that the vehicle 2 is in a parked state in a case where the sensor that detects whether the engine is on or off detects that the engine is off, the sensor that detects whether a door is open or closed detects that the door has been opened or closed once or more thereafter, and the sensor that detects whether or not a door is in a locked state detects that the door has been locked from outside the vehicle.

The operation of the control system 1 will be described with reference to a flowchart shown in FIG. 5.

In step S101, the vehicle 2 receives a request signal transmitted by the first terminal device 30 via the information processing apparatus 20.

In step S102, the control device 10 acquires the result of detection about the vehicle state of the vehicle 2 from the first sensor group 12.

In step S103, the control device 10 determines whether or not the vehicle state satisfies the first condition based on the vehicle state of the vehicle 2 acquired from the first sensor group 12. In a case where the control device 10 determines that the first condition is not satisfied, that is, in a case where the result of the determination in step S103 is No, the control device 10 proceeds to step S104. In a case where the control device 10 determines that the first condition is satisfied, that is, in a case where the result of the determination in step S103 is Yes, the control device 10 proceeds to step S105.

In step S104, the control device 10 does not start the engine of the vehicle 2.

In step S105, the control device 10 starts the engine of the vehicle 2. After the engine of the vehicle 2 is started, the control device 10 may operate the air conditioning device 11.

Modification Example of Operation of Control System

An operation according to a modification example of the control system 1 will be described.

When the vehicle 2 receives the request signal, the controller 103 of the control device 10 acquires the vehicle state of the vehicle 2 from the first sensor group 12 via the communication unit 101 and acquires the result of detection about the state of the vicinity of the vehicle 2 from the second sensor group 13 via the communication unit 101 before the engine of the vehicle 2 is started.

The controller 103 determines whether or not the vehicle state satisfies the first condition based on the vehicle state of the vehicle 2 acquired from the first sensor group 12 and determines whether or not the vehicle state satisfies the second condition based on the state of the vicinity of the vehicle 2 acquired from the second sensor group 13.

The state of the vicinity of the vehicle 2 that the controller 103 acquires from the second sensor group 13 includes information on whether or not there is an object in the vicinity of the vehicle 2.

The second condition includes a condition as follows.

A condition that "no object is detected in the vicinity of the vehicle 2".

Hereinafter, the condition as above will also be referred to as a "condition C".

The controller 103 determines whether or not the vehicle state of the vehicle 2 satisfies the first condition including the condition A or the condition B and determines whether or not the state of the vicinity of the vehicle 2 satisfies the second condition including the condition C. The controller 103 starts the engine of the vehicle 2 in a case where both of the first condition and the second condition are satisfied and does not start the engine of the vehicle 2 in a case where any of the first condition and the second condition is not satisfied.

As described above, even in a case where the vehicle state satisfies the first condition, the controller 103 does not start the engine of the vehicle 2 in a case where there is an object detected in the vicinity of the vehicle 2. Accordingly, with the control device 10, it is possible to further improve safety at the time of the start of the engine of the vehicle 2 performed by means of remote control.

The controller 103 may determine whether or not there is an object in the vicinity of the vehicle 2 based on the result of detection performed by various kinds of sensors included in the second sensor group 13.

For example, the controller 103 may determine that there is an object in the vicinity of the vehicle 2 in a case where the clearance sonar included in the second sensor group 13 detects the object in the vicinity of the vehicle 2.

In addition, the controller 103 may determine that there is an object in the vicinity of the vehicle 2 in a case where the blind spot monitor included in the second sensor group 13 detects the object in the vicinity of the vehicle 2.

The second condition may include a condition that the vehicle 2 is not stopped in a closed space in addition to the condition C. The closed space is, for example, a parking lot of a building, or a garage, or the like. For example, when the engine of the vehicle 2 is started in a state where the vehicle 2 is stopped in a closed space, there is a possibility that the concentration of carbon monoxide becomes high in the vicinity of the vehicle 2. With the second condition including a condition that the vehicle 2 is not stopped in a closed space in addition to the condition C, the control device 10 can reduce the possibilities as above.

The controller 103 may determine whether or not the vehicle 2 is stopped in a closed space based on the position information of the vehicle 2 detected by the position measurement device 14 and map information. The controller 103 may acquire the map information from a map server via the communication unit 101, the map server being connected to the network 50, for example. Alternatively, the map information may be stored in the storage unit 102 of the control device 10.

For example, there is a case where a garage at a house or the like is provided with ventilation equipment. In such a case, the concentration of carbon monoxide does not become high even when the engine of the vehicle 2 is started in the garage which is a closed space. In order to make starting the engine of the vehicle 2 in a closed space provided with ventilation equipment as described above possible, the controller 103 may transmit information about a place where the vehicle 2 is stopped to the second terminal device 40 held by the user in a case where the vehicle 2 is stopped in a closed space such that the user is caused to determine whether or not to start the engine.

The controller 103 may transmit, an image of the vicinity of the vehicle 2 captured by the out-of-vehicle camera included in the second sensor group 13 to the second terminal device 40 via the communication unit 101, for example.

When the image of the vicinity of the vehicle 2 is acquired via the communication unit 401, the controller 405 of the second terminal device 40 causes the output unit 404 to display the image of the vicinity of the vehicle 2 and a message for confirmation on whether or not to allow the engine to be started.

When input indicating that the starting of the engine is allowed is acquired through an operation that is performed by the user on the input unit 403, the controller 405 transmits information indicating that the starting of the engine is allowed to the control device 10 via the communication unit 401.

When the information indicating that the starting of the engine is allowed is acquired from the second terminal device 40 via the communication unit 101, the controller 103 of the control device 10 starts the engine of the vehicle 2 even in a case where the vehicle 2 is stopped in a closed space if the other conditions are satisfied.

The operation of the control system 1 according to the modification example will be described with reference to a flowchart shown in FIG. 6.

Figure 5:
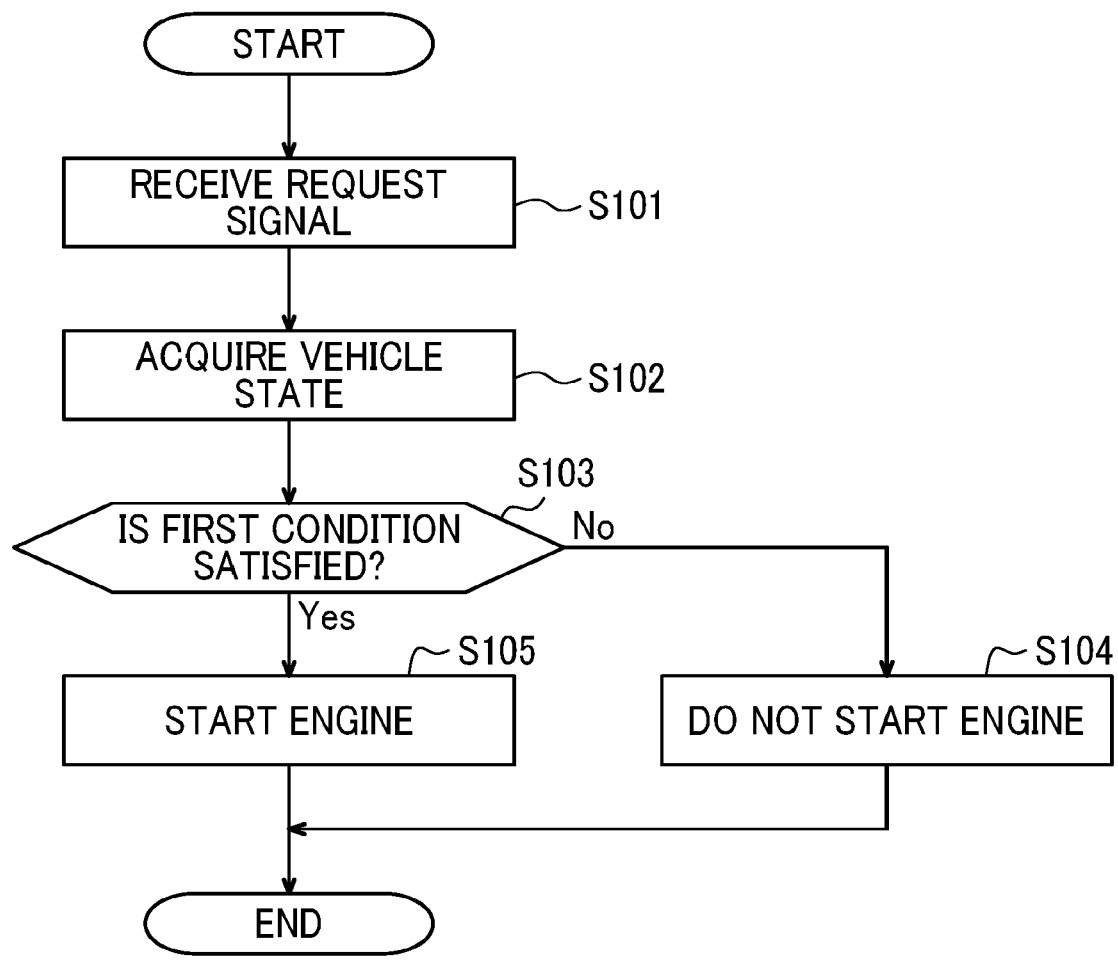
FIG. 5 is a flowchart showing an operation of the control system according to the embodiment of the disclosure.

Processing in step S201 to step S204 is the same as processing in step S101 to step S104 shown in FIG. 5 and thus description thereof will be omitted.

In step S205, the control device 10 acquires the result of detection about the state of the vicinity of the vehicle 2 from the second sensor group 13.

In step S206, the control device 10 determines whether or not the state of the vicinity satisfies the second condition based on the result of detection about the state of the vicinity of the vehicle 2 acquired from the second sensor group 13. In a case where the control device 10 determines that the second condition is not satisfied, that is, in a case where the result of the determination in step S206 is No, the control device 10 proceeds to step S204. In a case where the control device 10 determines that the second condition is satisfied, that is, in a case where the result of the determination in step S206 is Yes, the control device 10 proceeds to step S207.

In step S207, the control device 10 starts the engine of the vehicle 2. After the engine of the vehicle 2 is started, the control device 10 may operate the air conditioning device 11.

Stoppage of Engine After Start of Engine

Figure 6:
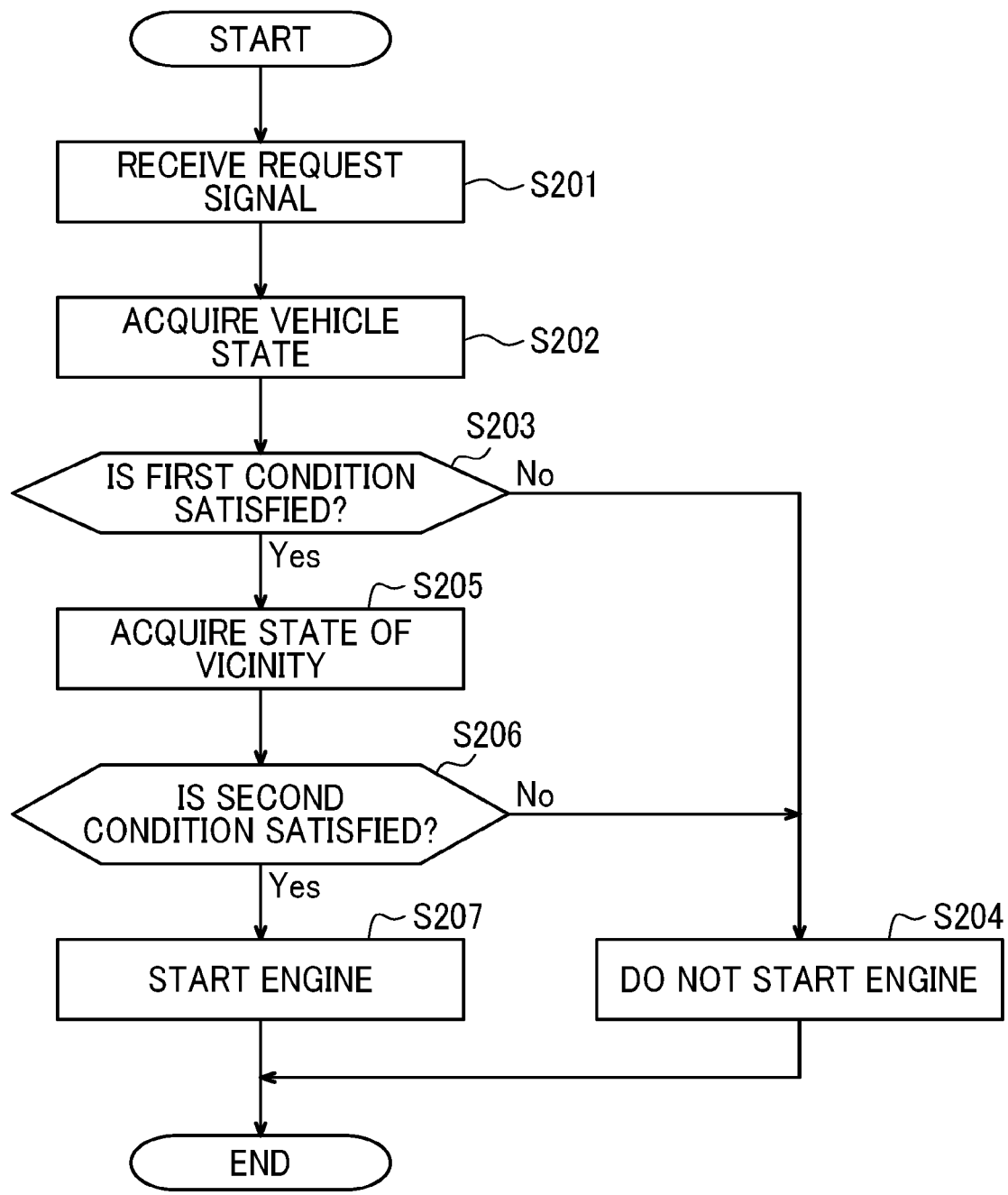
FIG. 6 is a flowchart showing an operation of the control system according to the embodiment of the disclosure.

The controller 103 of the control device 10 may stop the engine in a case where a predetermined condition is satisfied after the engine of the vehicle 2 is started through processing in step S105 in FIG. 5 or processing in step S207 in FIG. 6. Accordingly, with the control device 10, it is possible to further improve safety at the time of the start of the engine of the vehicle 2 performed by means of remote control.

For example, the controller 103 may stop the engine of the vehicle 2 in a case where the acceleration sensor included in the first sensor group 12 detects movement of the vehicle 2.

In addition, for example, the controller 103 may stop the engine of the vehicle 2 in a case where the carbon monoxide sensor included in the second sensor group 13 detects carbon monoxide of a concentration equal to or greater than a predetermined concentration threshold value.

As described above, in the control device 10 according to the present embodiment, the controller 103 acquires the result of detection about the vehicle state from the first sensor group 12 before the engine of the vehicle 2 is started in response to a request signal and the controller 103 starts the engine in a case where the vehicle state satisfies the first condition including a condition relating to a range of the transmission of the vehicle 2 and does not start the engine in a case where the vehicle state does not satisfy the first condition. As described above, in the case of the control device 10 according to the present embodiment, the engine of the vehicle 2 is not started in a case where the vehicle state does not satisfy the first condition including the condition relating to a range of the transmission of the vehicle 2. Accordingly, with the control device 10 according to the present embodiment, it is possible to improve safety at the time of the start of the engine of the vehicle 2 performed by means of remote control.

The disclosure is not limited to the embodiment described above. For example, a plurality of blocks described in a block diagram may be combined with each other or one block may be divided. Instead of performing a plurality of steps described in a flowchart in a chronological order as in the description, the steps may be performed in parallel or in a different order in accordance with the processing capacity of a device performing each step or as needed. Other modifications without departing from the scope of the disclosure can also be made.

For example, a portion of processing performed in the control device 10 in the above-described embodiment may be performed in the information processing apparatus 20.

For example, in the above-described embodiment, the control device 10 is installed in the vehicle 2. However, the control device 10 may be installed outside the vehicle 2.

For example, a configuration in which a general-purpose electronic device such as a computer functions as the control device 10 according to the above-described embodiment may also be adopted. Specifically, a program in which the content of processing for realization of each function of the control device 10 or the like according to the embodiment is written may be stored in a memory of the electronic device so that the program is read and executed by a processor of the electronic device. Therefore, the disclosure according to the embodiment can be realized in the form of a program executable by a processor.

For example, in the above-described embodiment, the vehicle 2 receives the request signal transmitted by the first terminal device 30 via the information processing apparatus 20. However, the vehicle 2 may directly receive the request signal transmitted by the first terminal device 30.

What is claimed is:

1. A control device configured to control a vehicle in which an engine is able to be started in response to a request signal transmitted from an outside of the vehicle, the control device comprising:
   a controller configured to:
      acquire a result of detection about a vehicle state of the vehicle from a first sensor group including one or more sensors able to detect the vehicle state of the vehicle before the engine of the vehicle is started in response to the request signal;
      acquire a result of detection about a state of a vicinity of the vehicle from a second sensor croup including one or more sensors able to detect the state of the vicinity before the engine of the vehicle is started in response to the request signal;
      transmit information about the state of the vicinity to a terminal device external to the vehicle in a case where the vehicle is stopped in a closed space in order to receive a determination from the terminal device regarding whether or Trot to start the engine;
      receive the determination from the terminal device regarding whether or not to start the engine in the case where the vehicle is stopped in the closed space;
      start the engine in a case where (i) the vehicle state satisfies a first condition including a condition relating to a range of a transmission of the vehicle, and (ii) the state of the vicinity satisfies a second condition including a condition that the vehicle is not stopped in a closed space;
      start the engine in a case where (i) the vehicle state satisfies the first condition, (ii) the state of the vicinity does not satisfy the second condition, and (iii) the determination from the terminal device is to start the engine;
      not start the engine in a case where the vehicle state does not satisfy the first condition; and
      not start the engine in a case where (i) the vehicle state satisfies the first condition, (ii) the state of the vicinity does not satisfy the second condition, and (iii) the determination from the terminal device is to not start the engine.

2. The control device according to claim 1, wherein the first condition includes a condition that a parking range is on and ranges other than the parking range are off in transmission range settings of the vehicle.

3. The control device according to claim 2, wherein the first condition further includes a condition that there is no person on board the vehicle.

4. The control device according to claim 1, wherein the first condition includes a condition that any one of a condition that a parking range is on and ranges other than the parking range are off in transmission range settings of the vehicle and a condition that a neutral range is on, ranges other than the neutral range are off, and a parking brake of the vehicle is on in the transmission range settings of the vehicle is satisfied.

5. The control device according to claim 1, wherein the second condition includes a condition that there is no object detected in the vicinity of the vehicle.

6. A vehicle in which the control device according claim 1 is installed.

7. A control system comprising:
   the control device according to claim 1; and
   an information processing apparatus configured to transmit the request signal to the control device when the request signal is received from the terminal device.

8. A program causing a control device configured to control a vehicle in which an engine is able to be started in response to a request signal transmitted from an outside of the vehicle to perform an operation comprising:
   acquiring a result of detection about a vehicle state of the vehicle from a first sensor group including one or more sensors able to detect the vehicle state of the vehicle before the engine of the vehicle is started in response to the request signal;
   acquiring a result of detection about a state of a vicinity of the vehicle from a second sensor group including one or more sensors able to detect the state of the vicinity before the engine of the vehicle is started in response to the request signal;
   transmitting information about the state of the vicinity to a terminal device external to the vehicle in a case where the vehicle is stopped in a closed space in order to receive a determination from the terminal device regarding whether or not to start the engine;
   receiving the determination from the terminal device regarding whether or not to start the engine in the case where the vehicle is stopped in the closed space;
   starting the engine in a case where (i) the vehicle state satisfies a first condition including a condition relating to a range of a transmission of the vehicle, and (ii) the state of the vicinity satisfies a second condition including a condition that the vehicle is not stopped in a closed space;
   starting the engine in a case where (i) the vehicle state satisfies the first condition, (ii) the state of the vicinity does not satisfy the second condition, and (iii) the determination from the terminal device is to start the engine;
   not starting the engine in a case where the vehicle state does not satisfy the first condition; and
   not starting the engine in a case where (i) the vehicle state satisfies the first condition, (ii) the state of the vicinity does not satisfy the second condition, and (iii) the determination from the terminal device is to not start the engine.

9. The program according to claim 8, wherein the first condition includes a condition that a parking range is on and ranges other than the parking range are off in transmission range settings of the vehicle.

10. The program according to claim 9, wherein the first condition further includes a condition that there is no person on board the vehicle.

11. The program according claim 8, wherein the first condition includes a condition that any one of a condition that a parking range is on and ranges other than the parking range are off in transmission range settings of the vehicle and a condition that a neutral range is on, ranges other than the neutral range is off, and a parking brake of the vehicle is on in the transmission range settings of the vehicle is satisfied.

12. The program according to claim 8, wherein the second condition includes a condition that there is no object detected in the vicinity of the vehicle.

13. A control method for a control device configured to control a vehicle in which an engine is able to be started in response to a request signal transmitted from an outside of the vehicle, the method comprising:

acquiring a result of detection a vehicle state of the vehicle from a first sensor group including one or more sensors able to detect the vehicle state of the vehicle before the engine of the vehicle is started in response to the request signal;

acquiring a result of detection about a state of a vicinity of the vehicle from a second sensor group including one or more sensors able to detect the state of the vicinity before the engine of the vehicle is started in response to the request signal;

transmitting information about the state of the vicinity to a terminal device external to the vehicle in a case where the vehicle is stopped in a closed space in order to receive a determination from the terminal device regarding whether or not to start the engine;

receiving the determination from the terminal device regarding whether or not to start the engine in the case where the vehicle is stopped in the closed space;

starting the engine in a case where (i) the vehicle state satisfies a first condition including a condition relating to a range of a transmission of the vehicle, and (ii) the state of the vicinity satisfies a second condition including a condition that the vehicle is not stopped in a closed space;

starting the engine in a case where (i) the vehicle state satisfies the first condition, (ii) the state of the vicinity does not satisfy the second condition, and (iii) the determination from the terminal device is to start the engine;

not starting the engine in a case where the vehicle state does not satisfy the first condition; and not starting the engine in a case where (i) the vehicle state satisfies the first condition, (ii) the state of the vicinity does not satisfy the second condition, and (iii) the determination from the terminal device is to not start the engine.

14. The control method according to claim 13, wherein the first condition includes a condition that a parking range is on and ranges other than the parking range are off in transmission range settings of the vehicle.

15. The control method according to claim 14, wherein the first condition further includes a condition that there is no person on board the vehicle.

16. The control method according to claim 13, wherein the first condition includes a condition that any one of a condition that a parking range is on and ranges other than the parking range are off in transmission range settings of the vehicle and a condition that a neutral range is on, ranges other than the neutral range are off, and a parking brake of the vehicle is on in the transmission range settings of the vehicle is satisfied.

17. The control method according to claim 13, wherein the second condition includes a condition that there is no object detected in the vicinity of the vehicle.

* * * * *